(12) United States Patent
Shrader

(10) Patent No.: US 9,285,834 B2
(45) Date of Patent: Mar. 15, 2016

(54) MOBILE WRITER FOR ERASABLE MEDIA

(75) Inventor: Eric J. Shrader, Belmont, CA (US)

(73) Assignee: Palo Alto Research Center, Incorporated, Palo Alto, CA (US)

( * ) Notice: Subject to any disclaimer, the term of this patent is extended or adjusted under 35 U.S.C. 154(b) by 1219 days.

(21) Appl. No.: 12/555,317

(22) Filed: Sep. 8, 2009

(65) Prior Publication Data

US 2011/0057869 A1     Mar. 10, 2011

(51) Int. Cl.
*G09G 3/34* (2006.01)
*G06F 1/16* (2006.01)
*G03C 1/73* (2006.01)

(52) U.S. Cl.
CPC ............ *G06F 1/1647* (2013.01); *G06F 1/1692* (2013.01); *G06F 1/1694* (2013.01); *G03C 1/73* (2013.01)

(58) Field of Classification Search
None
See application file for complete search history.

(56) References Cited

U.S. PATENT DOCUMENTS

| | | | |
|---|---|---|---|
| 5,155,607 A | 10/1992 | Inoue et al. | |
| 5,511,148 A | 4/1996 | Wellner | |
| 5,561,449 A | 10/1996 | Raskin et al. | |
| 5,593,236 A | 1/1997 | Bobry | |
| 5,927,872 A | 7/1999 | Yamada | |
| 5,988,900 A | 11/1999 | Bobry | |
| 6,067,112 A | 5/2000 | Wellner et al. | |
| 6,357,939 B1 | 3/2002 | Baron | |
| 6,517,266 B2 | 2/2003 | Saund | |
| 7,034,865 B2 | 4/2006 | Tojo et al. | |
| 7,246,958 B2 * | 7/2007 | Saund et al. | 400/88 |
| 8,054,533 B2 * | 11/2011 | Araki et al. | 359/296 |

(Continued)

FOREIGN PATENT DOCUMENTS

| | | | |
|---|---|---|---|
| EP | 1119193 A | 7/2001 | |
| JP | 05050736 A | 3/1993 | |

(Continued)

OTHER PUBLICATIONS

Unknown Author, ScanSoft Productivity Without Boundaries, http://www.scansoft.co.uk/omniform/omniform4/, Oct. 28, 2003, pp. 1-10.

*Primary Examiner* — Adam R Giesy
*Assistant Examiner* — Henok Heyi
(74) *Attorney, Agent, or Firm* — MH2 Technology Law Group LLP

(57) ABSTRACT

A mobile imaging system includes an erasable medium and an imaging device. The erasable medium can be a UV imageable photochromic medium. The imaging device includes an input for generating imageable content in the device, a sensor for detecting and interpreting interaction of the device with respect to an imageable surface of the erasable medium, and an imaging component, responsive to the sensor, for outputting the generated content onto the imageable surface of the erasable medium.

19 Claims, 4 Drawing Sheets

(56) References Cited

U.S. PATENT DOCUMENTS

| | | |
|---|---|---|
| 2002/0171731 A1 | 11/2002 | Saund |
| 2003/0043388 A1 | 3/2003 | Andrews et al. |
| 2003/0051615 A1 | 3/2003 | Denoue et al. |
| 2003/0103762 A1* | 6/2003 | Araki et al. .................. 386/46 |
| 2004/0252099 A1* | 12/2004 | Walder et al. ................ 345/105 |
| 2005/0063199 A1* | 3/2005 | Levy et al. .................... 362/565 |
| 2007/0054215 A1 | 3/2007 | Iftime et al. |
| 2008/0019569 A1* | 1/2008 | Rhoads et al. ................ 382/107 |
| 2008/0214233 A1* | 9/2008 | Wilson et al. ............... 455/556.1 |
| 2008/0310869 A1* | 12/2008 | Iftime et al. .................... 399/51 |
| 2008/0311521 A1 | 12/2008 | Kazmaier et al. |
| 2009/0286572 A1* | 11/2009 | Rhoads et al. ................ 455/557 |
| 2009/0322673 A1* | 12/2009 | Cherradi El Fadili ........ 345/157 |
| 2010/0026470 A1* | 2/2010 | Wilson et al. ............. 340/10.52 |
| 2011/0037695 A1* | 2/2011 | Bor et al. ....................... 345/158 |

FOREIGN PATENT DOCUMENTS

| | | |
|---|---|---|
| JP | 08224941 A | 9/1996 |
| WO | 0194118 A | 12/2001 |
| WO | 0202343 A | 1/2002 |
| WO | 03006249 A | 1/2003 |
| WO | 03055688 A | 7/2003 |
| WO | 03055689 A | 7/2003 |
| WO | 03076198 A | 9/2003 |

* cited by examiner

MOBILE WRITER FOR ERASABLE MEDIA

FIELD OF THE INVENTION

This invention relates generally to imaging and, more particularly, to imaging erasable media with a mobile writing device.

BACKGROUND OF THE INVENTION

Paper documents are often promptly discarded after being read. Although paper is relatively inexpensive, the quantity of discarded paper documents is enormous and the disposal of these discarded paper documents raises significant cost and environmental issues. It would, therefore, be desirable for paper documents to be reusable, to minimize both cost and environmental issues.

Erasable media is that which can be reused many times to transiently store images, the images being written on and erasable from the erasable media. For example, photochromic paper employs photochromic materials to provide an imageable surface. Typically, photochromic materials can undergo reversible or irreversible photoinduced color changes in the photochromic containing layer. In addition, the reversible photoinduced color changes enable imaging and erasure of photochromic paper in sequence on the same paper. For example, a light source of a certain wavelength can be used for imaging erasable media, while at least one of heat and light can be used for inducing erasure of imaged erasable media. An inkless erasable imaging formulation is the subject of U.S. patent application Ser. No. 12/206,136 filed Sep. 8, 2008 and titled "Inkless Reimageable Printing Paper and Method" which is commonly assigned with the present application to Xerox Corp., and is incorporated in its entirety herein by reference.

Because imaging of erasable media has unique requirements, it has previously required dedicated equipment. In particular, a UV source can be required to image the erasable media, and heat can be required to erase an imaged erasable media. In addition, specific temperature parameters are required for each of the imaging and erasing of erasable media. With increasingly mobile and on-demand consumers, it can be advantageous to image erasable media with portable or hand-held devices, particularly if the portable imaging device can be highly efficient and cost effective.

Thus, there is a need to provide a mobile imaging device for selectively imaging erasable media.

SUMMARY OF THE INVENTION

According to various embodiments, the present teachings include a mobile imaging device for use with erasable media. The mobile imaging device includes an input for generating imageable content in the device; a sensor for detecting and interpreting interaction of the device with respect to an imageable surface of an erasable medium; and an imaging component, responsive to the sensor, for outputting the generated content onto the imageable surface of the erasable medium.

According to various embodiments, the present teachings include a mobile imaging system. The mobile imaging system includes an erasable medium; and an imaging device. The imaging device includes an input for generating imageable content in the device, a sensor for detecting and interpreting interaction of the device with respect to an imageable surface of the erasable medium, and an imaging component, responsive to the sensor, for outputting the generated content onto the imageable surface of the erasable medium.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

It should be noted that some details of the figures have been simplified and are drawn to facilitate understanding of the inventive embodiments rather than to maintain strict structural accuracy, detail, and scale.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

As used herein, the term "erasable media" refers to a substrate including an imaging medium that can be reused multiple times to transiently store and/or remove images and/or text. In embodiments, the imaging medium can include a photochromic material that can undergo reversible color change to enable image-writing and image-erasing. Erasable media can be selectively imaged and erased. The image formed can be transient in nature and fade away over time or it can remain until actively erased.

The substrate of the erasable medium can be, for example paper, glass, ceramic, wood, plastic, fabric, textile, and/or metal. In embodiments, the "erasable medium" can have the appearance and feel of traditional paper, including cardstock and other weights of paper.

As used herein, imaged erasable media refers to erasable media having a visible image thereon, the image a result of, for example, ultraviolet (UV) imaging of the erasable media.

As used herein, non-imaged erasable media refers to erasable media which has not been previously imaged, or erasable media having an image erased therefrom and available for UV imaging. An exemplary erasable medium is described in connection with FIG. 1 below.

As used herein, the term "non-erasable" refers to traditional media of the type used in any conventional imaging such as ink jet, xerography, or liquid ink electrophotography, as known in the art. An example of a non-erasable traditional medium can be conventional paper.

Figure 1:
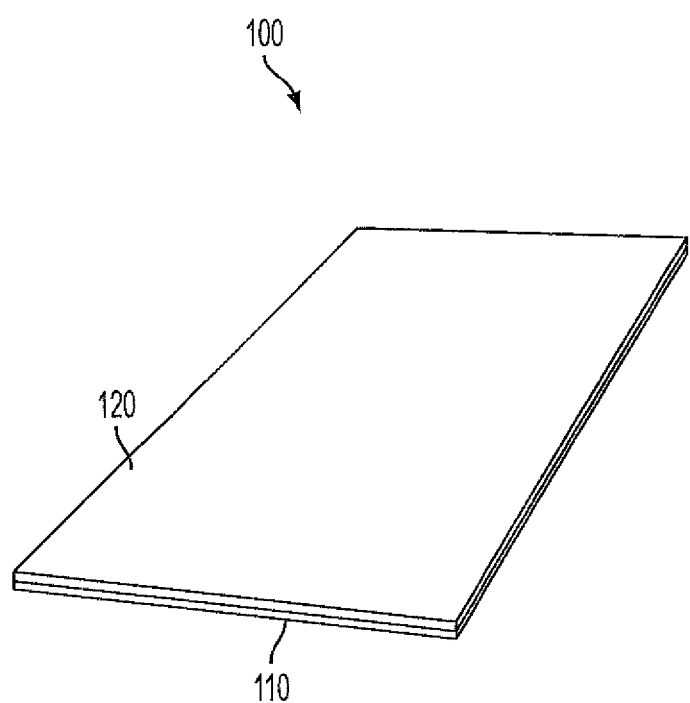
FIG. 1 is a perspective depiction of an erasable medium.

FIG. 1 depicts an exemplary erasable medium 100 in accordance with the present teachings. It should be readily apparent to one of ordinary skill in the art that the erasable medium 100 depicted in FIG. 1 represents a generalized schematic illustration and that other layers can be added or existing layers can be removed or modified.

As shown in FIG. 1, the erasable medium 100 can include a substrate 110 and a photochromic material 120 incorporated into or on the substrate 110. The photochromic material 120 can provide a reversible writing (i.e. erasable) image-forming component on the substrate 110.

The substrate 110 can include, for example, any suitable material such as paper, wood, plastics, fabrics, textile products, polymeric films, inorganic substrates such as metals, and the like. The paper can include, for example, plain papers such as XEROX® 4024 papers, ruled notebook paper, bond paper, and silica coated papers such as Sharp Company silica coated paper, Jujo paper, and the like. The substrate 110, such as a sheet of paper, can have a blank appearance.

In various embodiments, the substrate 110 can be made of a flexible material and can be transparent or opaque. The substrate 110 can be a single layer or multi-layer where each layer is the same or different material and can have a thickness, for example, ranging from about 0.05 mm to about 5 mm.

The photochromic material 120 can be impregnated, embedded or coated to the substrate 110, for example, a porous substrate such as paper. In various embodiments, the photochromic material 120 can be applied uniformly to the substrate 110 and/or fused or otherwise permanently affixed thereto.

Portion(s) of photochromic material of an imaged erasable medium 100 can be erased. In order to produce the transition from a visible image to an erased medium, heat can be applied to the erasable medium 100 at a temperature suitable for effecting the erasure. For example, at a temperature between about 80° C. to about 200° C., the erasable medium 100 can be completely erased. In order to re-image the erased (or image an original) erasable medium 100, the erasable medium 100 can be heated to a temperature of between about 55° C. to about 80° C. before writing using, for example, UV exposure.

It will be appreciated that other types of erasable media, other than photochromic paper, can be used in connection with the exemplary embodiments herein. Such types of erasable media are intended to be included within the scope of the disclosure.

While the temperatures for processing erasable media can be achieved and maintained in a single mode device for imaging and erasing erasable media, the following describes an exemplary incorporation of a dual mode imaging system capable of processing erasable media as well as producing traditional (non-erasable) prints and copies. The traditional prints and copies can be produced by ink jet. The ink jet can include aqueous ink jet, solid ink jet and gel ink jet.

Figure 2A:
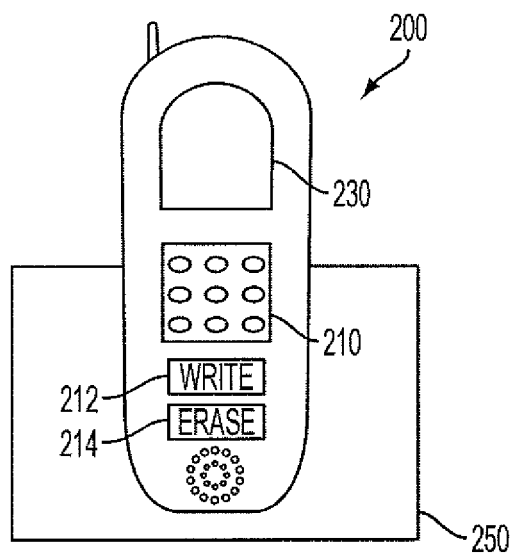
FIG. 2A is a front view of a mobile erasable media imaging device in accordance with the present teachings.
Figure 2B:
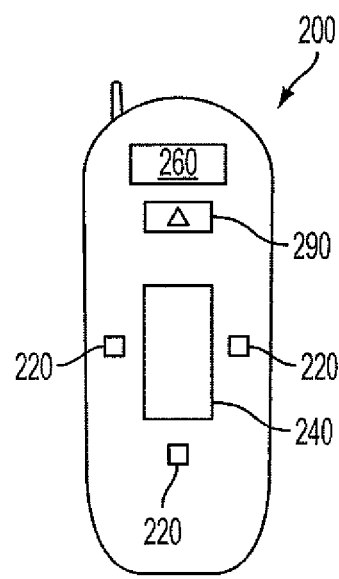
FIG. 2B is a rear view of the mobile erasable media imaging device in accordance with the present teachings.

FIGS. 2A and 2B depict an exemplary mobile imaging device 200 from a front and rear, respectively, in accordance with the present teachings. It should be readily apparent to one of ordinary skill in the art that the mobile imaging device 200 depicted in FIGS. 2A and 2B represents a generalized schematic illustration and that other components can be added or existing components can be removed or modified. The mobile imaging device can print on a small, mobile scale.

As shown in FIGS. 2A and 2B collectively, the mobile imaging device 200 can include an input 210 for generating imageable content in the device, a sensor 220 for detecting and interpreting interaction of the device with respect to an imageable surface of an erasable medium, a display 230, and an imaging component 240, responsive to at least the sensor 220, for outputting the generated content onto an imageable surface of erasable media 250. Erasable media 250 can include UV imageable photochromic paper.

The mobile imaging device 200 can be of a shape and size to accommodate the exemplary components thereof. In embodiments, the mobile imaging device 200 can be a hand held device, for example, a cellular telephone or a personal digital assistant (PDA).

In certain embodiments, the input 210 can include at least one of a keypad, a camera, optical reader, and wireless input. The wireless input can include transmitted Internet content, text message, voice mail, etc. The input 210 can include an audible input, the audible input convertible to data by the device 200. The input 210 can further include a camera function, in which the mobile imaging device can take a picture of that which is being viewed in the display 230.

Input into the mobile imaging device 200 can be viewed in the display 230. The display 230 can be larger than that of a conventional cell phone or PDA device and can be used while talking on the mobile device.

In embodiments, the sensor 220 can determine a proximity, spatial relationship, and orientation of the device 200 relative to the erasable medium 250. For example, the sensor 220 can include a paper sensor utilizing a surface tracking system such as that disclosed in U.S. Pat. No. 7,246,958, assigned to Xerox Corp., the subject matter of which is incorporated herein by reference, in its entirety.

In operation, once a user has desired information on the display 230, actuation of a "WRITE" key 212 enables the sensor 220 to sense that the device is in contact with the erasable medium 250. The user then traverses the edge or back of the mobile device 200 over the erasable medium 250 and the information is written on the erasable medium by the imaging device 200. It will be appreciated that the sensor 220 can likewise detect spatial proximity to the erasable medium 250 and, as such, imaging of the erasable medium 250 can be without direct contact between the device 200 and the erasable medium 250. The imaging device 200 can write on the erasable medium 250 via UV imaging. The sensor 220 can track the motion and position of the motion and compose the image accordingly so that the user does not necessarily need to have perfectly smooth or straight motion.

In embodiments, the imaging component 240 can include a radiant source matched with absorption characteristics of the erasable media, for example to the photochromic material of the erasable medium 250. The radiant source can include a wavelength in a range of about 250 to about 450 nanometers. The radiant source can be a UV source, for example UV LEDs, to image the erasable media 250. The UV LEDs can include an array of UV LEDs. The imaging component 240 can be on a front, back, side or other edge of the imaging device 200, and formed so as to face an exposed surface of the erasable medium 250. The imaging component 240 can further include the ability to track and stitch images over multiple swaths on the erasable medium 250.

The mobile imaging device 200 can further include an erase component 260. The erase component 260 can output heat, to a temperature suitable for erasing an imaged erasable medium 250. In embodiments, the erase component 260 can utilize a heat source, such as a heater 290 coupled to or included within the erase component, and configured to establish a predetermined temperature at a surface of the erasable media 250. The heater 290 can include hardware capable of elevating a temperature of an erasable medium 250 throughout the medium. The heater 290 can include heating lamps, flash lamps, and temperature and power controls. The heater 290 can be set to an erase temperature, which, when directed at the erasable medium 250, will correspondingly raise at least the surface temperature thereof. The erase temperature is that temperature at which the image on the erasable medium 250 can be removed. An erase temperature can be in a range of about 80° C. to about 200° C. Further, an erase temperature can be in a range of about 90° to about 140° C. At a certain temperature, the heater 290 can erase an imaged erasable medium 250.

In embodiments, the imaging component 240 can also utilize the heat source 290. The heat source can elevate a temperature of the erasable medium 250 to enable faster imaging of the erasable medium 250 at a temperature suitable for UV imaging. An exemplary UV imaging temperature of an erasable media can be from about 50° C. to about 90° C. A UV imaging temperature can further be from about 60° C. to about 80° C. The UV imaging temperature can be about 70° C. Other UV, IR or similar imaging temperatures can be set according to a type of erasable media and such imaging temperatures are intended to be included within the scope of the invention.

The erasable media 250 can be any size and shape. For example, an erasable medium the approximate size of an index card can be a suitable size for receiving images pertaining to directions or other applications that are mobile in nature, rather than writing them on paper scraps. The images on the index cards or other shape media will fade over time (currently about 3 to 5 days) and the index cards can then be re-used.

Figure 3:
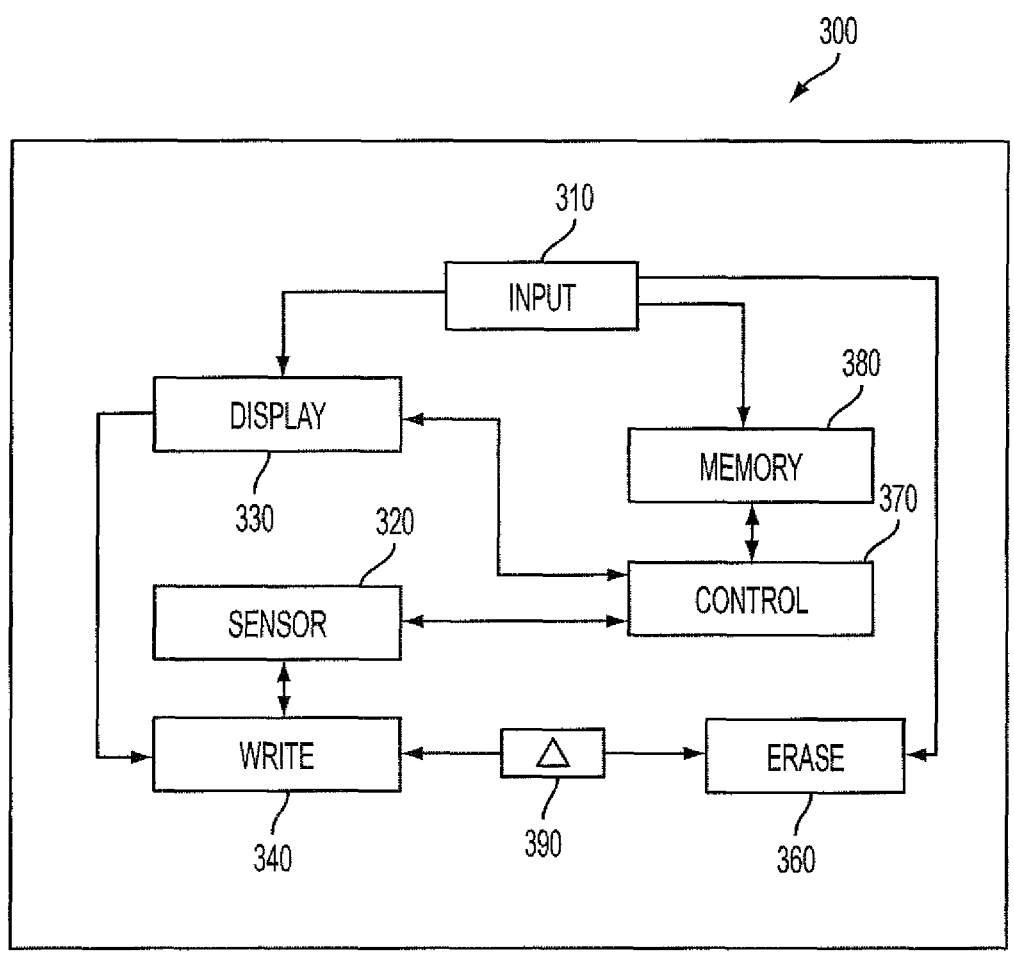
FIG. 3 is a schematic view depicting architecture of the mobile erasable media imaging device in accordance with the present teachings.

FIG. 3 schematically depicts components of an exemplary mobile imaging device 300 in accordance with the present teachings. It should be readily apparent to one of ordinary skill in the art that the mobile imaging device 300 depicted in FIG. 3 represents a generalized schematic illustration and that other components can be added or existing components can be removed or modified.

As shown in FIG. 3, the mobile imaging device 300 can include an input 310, a sensor 320, a display 330, a write component 340, and an erase component 360, each as described above in connection with FIGS. 2A and 2B, and for use in connection with erasable media. In addition, the mobile imaging device 300 can include control components 370 and memory 380.

In FIG. 3, any of a variety of inputs can be captured by input 310, the input stored in memory 380 and/or presented directly to the display 330. Upon selection of a write function, (212 in FIG. 2A), sensor 320 can determine a proximity to an erasable medium so that imaging of the erasable medium can occur with the write device 340. Sensor 320 can determine proximity of the imaging device to the erasable medium, and in connection with the control 370, enable writing of the display content to the erasable medium. Likewise, content stored in memory 380 can be imaged at the write component 340, via the control 370 and according to sensor 320. It will be further appreciated that actuation of an erase function (214 in FIG. 2A), can enable the erase component 360 to erase an image from an imaged erasable medium. As further depicted in FIG. 3, either of the write component 340 or the erase component 360 can utilize a heater 390 to perform either of a write or an erase function.

In embodiments, control components 370 can be provided in the imaging device 300. The control components 370, responsive to user input, can direct the functions of the imaging device 300. Memory 380 can be provided in the imaging device 300, for storing generated input and output, typically under direction of the control components 370.

Figure 4:
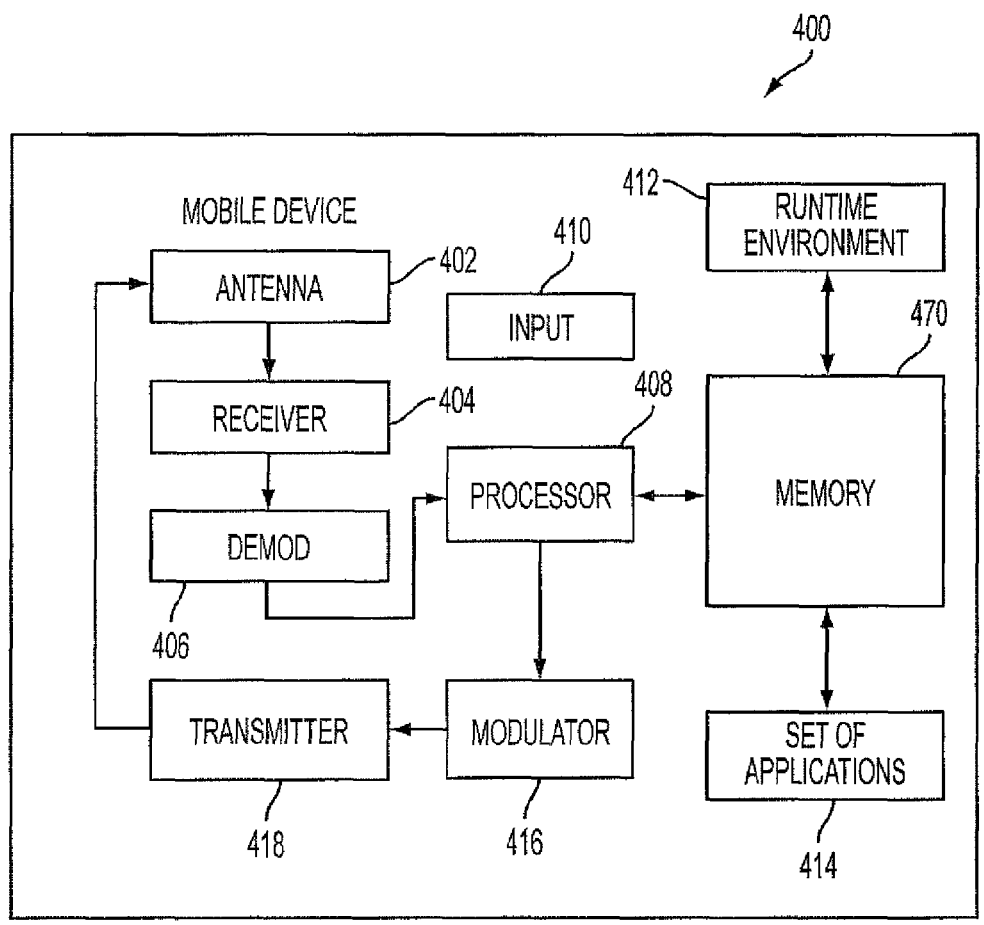
FIG. 4 is a schematic view depicting mobile telephone device architecture for use with the present teachings.

FIG. 4 illustrates an exemplary hardware configuration of a mobile device 400, such as a mobile phone for use with the mobile imaging device herein, and therefore consistent with implementations of the present teachings. Mobile device 400 can include at least one antenna 402 (e.g., a transmission receiver or group of such receivers comprising an input interface) that receives a signal (e.g., pertaining to a mobile call initiation or other handshake, a handshake response, a mobile application data transfer, a data event, data event response, handshake termination, and so on) and a receiver 404, which performs actions (e.g., filters, amplifies, down-converts, etc.) on the received signal. Antenna 402 can for example transmit or receive a response to a handshake request, data event request, or the like. Antenna 402 and receiver 404 can also be coupled with a demodulator 406 that can demodulate received signals and provide them to a processor 408 for processing. Mobile device 400 can additionally include memory 470 that is operatively coupled to processor 408 and that can store data to be transmitted, received, and the like.

Processor 408 can analyze information received by antenna 402 and/or user input 410 of the mobile device, and/or generate information for transmission by a transmitter 418 via a modulator 416. Additionally, processor 408 can control and/or reference one or more resources or components (e.g., 406, 412, 414, 416, and 418) of the mobile device 400. Additionally, processor 408 can execute a runtime environment 412, as well as one or more set of applications 414 or other software, modules, applications, logic, code, or the like.

Certain advantages of the mobile imaging device include the inkless environment, thus eliminating ink refills, and providing a small device which can be incorporated into the mobile phone itself. Using a typical cell phone's battery, about 290 notes can be printed before the battery will be depleted from the note writing. For example, using the imaging device eight or ten times between charges of the mobile imaging device will not significantly impact battery life. Without an ink based system, there are no jets to become clogged or be cleaned, no ink to spill, and nothing to dispose.

Variations can include configurations that are Bluetooth-connected to a cell phone, stand-alone note writing applications, and voice recorders with speech to printed text capability. These configurations are largely enabled by the elimination of the ink consumable cost and volume.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A mobile imaging device for use with erasable media, the device comprising:
    a housing sized to be held and operating using a single hand and arranged to house internal components, the housing comprising a first side and a second side opposite the first side; wherein the first side comprising:
    an input for generating imageable content in the device; a display for displaying the imageable content; an actuation selector for initiating imaging of the imageable content; and an erase selector for initiating an erase action;
    the second side comprising:
    a sensor for detecting interaction of the device with respect to an imageable surface of an erasable medium, wherein the sensor comprises a surface tracking system configured to correlate a position of the device with respect to the erasable media with a position in the imageable content; and
    an imaging component, responsive to the sensor, for outputting the imageable content onto the imageable surface of the erasable medium, the imaging component comprising an ultraviolet light-emitting diode (UV LED) that images or erases the erasable medium,
    wherein at least the imaging component is movable with respect to the erasable medium.

2. The device of claim 1, wherein the input for generating imageable content comprises a camera.

3. The device of claim 1, wherein the input for generating imageable content comprises a keypad.

4. The device of claim 1, wherein the input for generating imageable content comprises a wireless input.

5. The device of claim 1, wherein the input comprises at least one of Internet content, text message, and voice mail.

6. The device of claim 1, wherein the input comprises audible input, the audible input convertible to digital data at the device.

7. The device of claim 1, wherein a display shows the imageable content.

8. The device of claim 1, wherein the imageable content comprises digital data.

9. The device of claim 1, wherein the imaging component comprises an array of UV LEDs.

10. The device of claim 1, further comprising memory.

11. The device of claim 1, further comprising control components for directing the functions of the imaging device.

12. The device of claim 11, wherein the sensor is configured to determine a proximity to an erasable medium, and in connection with the control components, cause the imaging component to image the erasable medium or erase an image from an imaged erasable medium, or both.

13. The device of claim 1, wherein the erasable media comprises photochromic paper.

14. The device of claim 1, wherein the mobile device comprises a personal digital assistant (PDA).

15. The device of claim 1, wherein the mobile device comprises a cellular telephone.

16. The device of claim 1, further comprising an erase device for erasing an imaged surface of the erasable medium.

17. The device of claim 16, wherein the erase device outputs an amount of heat suitable to erase the imaged surface.

18. The device of claim 1, wherein the imaging component is configured to image the erasable medium without physically contacting the erasable medium.

19. A mobile imaging system, comprising: an erasable medium; and
    an imaging device that is movable with respect to the an erasable medium, the imaging device comprising,
    a housing sized to be held and operating using a single hand and arranged to house internal components, the housing comprising a first side and a second side opposite the first side; wherein the first side comprising:
    an input for generating imageable content in the device, a display for displaying the imageable content; an actuation selector for initiating imaging of the imageable content; and an erase selector for initiating an erase action;
    the second side comprising:
    a sensor for detecting and interpreting interaction of the device with respect to an imageable surface of the erasable medium, wherein the sensor comprises a surface tracking system configured to correlate a position of the device with respect to the erasable media with a position in the imageable content, and
    an imaging component, responsive to the sensor, for outputting the generated content onto the imageable surface of the erasable medium, the imaging component comprising an ultraviolet light-emitting diode (UV LED) that images or erases the erasable medium.

* * * * *